(12) United States Patent
Koeller et al.

(10) Patent No.: US 6,264,429 B1
(45) Date of Patent: Jul. 24, 2001

(54) COMPRESSOR BLADE OR VANE AND COMPRESSOR USING A BLADE OR VANE

(75) Inventors: Ulf Koeller, Muelheim An der Ruhr; Reinhard Moenig, Willich, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/472,225

(22) Filed: Dec. 27, 1999

Related U.S. Application Data

(63) Continuation of application No. PCT/DE98/01620, filed on Jun. 15, 1998.

(30) Foreign Application Priority Data

Jun. 24, 1997 (DE) .............................................. 197 26 847

(51) Int. Cl.$^7$ ...................................................... B63H 1/26
(52) U.S. Cl. .................................. 416/223 A; 416/DIG. 2
(58) Field of Search ...................................... 415/181, 191, 415/208.1, 208.2, 211.2, 914; 416/223 A, 223 R, 242, 243, DIG. 2, DIG. 5

(56) References Cited

U.S. PATENT DOCUMENTS

| | | | | |
|---|---|---|---|---|
| 4,431,376 | * | 2/1984 | Lubenstein et al. | 416/223 A |
| 5,088,892 | * | 2/1992 | Weingold et al. | 415/193 |
| 5,397,215 | * | 3/1995 | Spear et al. | 415/191 |

* cited by examiner

*Primary Examiner*—Edward K. Look
(74) *Attorney, Agent, or Firm*—Herbert L. Lerner; Laurence A. Greenberg; Werner H. Stemer

(57) ABSTRACT

A compressor blade or vane, in particular for a compressor of a stationary gas turbine, includes a blade or vane section configured in such a way that particularly low aerodynamic losses occur in the case of a flow around the compressor blade or vane at a large Reynolds number and a high degree of turbulence.

8 Claims, 6 Drawing Sheets

COMPRESSOR BLADE OR VANE AND COMPRESSOR USING A BLADE OR VANE

CROSS-REFERENCE TO RELATED APPLICATION

This application is a continuation of copending International Application No. PCT/DE98/01620, filed Jun. 15, 1998, which designated the United States.

BACKGROUND OF THE INVENTION

Field of the Invention

The invention relates to a compressor blade or vane and a compressor using such a blade or vane.

German Patent DE 31 41 948 C2, corresponding to U.S. Pat. No. 4,431,376, describes a blade or vane with a conical blade or vane section for the compressor of a gas turbine. It is stated that when gas flows at high velocity through blades or vanes of a compressor disposed in rows, shock waves can be experienced. The gas flows in a boundary layer along the surface of the blades or vanes that are affected. Separation of that boundary layer from the blade or vane surface can occur because of a shock wave. That causes aerodynamic losses. Those losses limit the efficiency of the blades or vanes. Such losses are of particular importance in a transonic flow field, i.e. in a flow field which contains adjacent regions of local subsonic velocity and local supersonic velocity. It is possible to optimize the section of the blade or vane in order to reduce those losses. That patent specifies a blade or vane with a conical blade or vane section, a profiled suction surface and a profiled pressure surface. The blade or vane has good aerodynamic performance capability and can also be manufactured in a simple manner. The objective of that device is further optimization of the efficiency of a compressor blade or vane.

An aircraft propeller with specially configured propeller blade sections is described in U.S. Pat. No. 4,773,825. The propeller blade sections are constructed in such a way that different loading conditions can be dealt with during a flight operation, for example in a climb or cruise phase.

SUMMARY OF THE INVENTION

It is accordingly an object of the invention to provide a compressor blade or vane having particularly good properties with respect to efficiency, and a compressor using such a blade or vane, which overcome the hereinafore-mentioned disadvantages of the heretofore-known devices of this general type.

With the foregoing and other objects in view there is provided, in accordance with the invention, a compressor blade or vane, comprising a blade or vane section having a blade or vane leading edge point; a blade or vane trailing edge point; a straight line section chord extending from the blade or vane leading edge point to the blade or vane trailing edge point and having a given length; and a suction surface profile with a convex curvature and a pressure surface profile opposite the suction surface profile, each of the profiles connecting the blade or vane leading edge point and the blade or vane trailing edge point, the suction surface profile having a radius of curvature at a suction surface intersection point with a reference straight line cutting the section chord at right angles at 5% of the given length, the radius of curvature being less than half of the given length.

A compressor blade or vane configured in this way offers the advantage of having particularly low aerodynamic losses especially under flow conditions with large Reynolds numbers and high degrees of turbulence. The concepts of Reynolds number and degree of turbulence should be understood herein in accordance with a definition given in a book entitled "Strömungslehre (Fluid Flow Science)" by Heinz Schade and Ewald Kunz, Verlag Walter De Gruyter, Berlin and N.Y., 1989, Pages 290 and 325.

The invention is based on the knowledge that the usual optimizations of compressor blades and vanes, in accordance with experimental measurement data gained in wind tunnels, do not adequately reflect the real conditions in a compressor. Generally speaking, the flow conditions with large Reynolds numbers and high degrees of turbulence mentioned are only achievable in the wind tunnel with a high degree of complication, if at all. However, they are of considerable importance in a compressor, particularly in a compressor of high power. The construction of the novel compressor blade or vane described above is undertaken on the basis of this knowledge.

In accordance with another feature of the invention, the blade or vane section encloses a circle with a maximum diameter, which maximum diameter defines a maximum section thickness, with a center distance vertical or straight line passing through the center of this circle intersecting the section chord at right angles and being at a center distance from the blade or vane leading edge point which is less than 32% of the length of the section chord and is, in particular, located between 15% and 30% of the length of the section chord. This geometrical feature implies a particular improvement in the properties of the compressor blade or vane with respect to the aerodynamic losses in flows with large Reynolds numbers and high degrees of turbulence.

In accordance with a further feature of the invention, the suction surface profile has a suction surface tangent at the suction surface intersection point and the pressure surface profile has a pressure surface tangent at a pressure surface intersection point with the reference vertical or straight line, the suction surface tangent and the pressure surface tangent enclosing between them a tangent angle of between 5° and 20°.

With the objects of the invention in view there is also provided a compressor blade or vane, comprising a blade or vane section having a blade or vane leading edge point; a blade or vane trailing edge point; a straight line section chord extending from the blade or vane leading edge point to the blade or vane trailing edge point and having a given length; a suction surface profile having a convex curvature and a pressure surface profile opposite the suction surface profile, each of the profiles connecting the blade or vane leading edge point and the blade or vane trailing edge point; a circle enclosed by the blade or vane section and having a center and a maximum diameter, the maximum diameter defining a maximum section thickness; and a center distance straight line passing through the center, intersecting the section chord at right angles and being spaced at a center distance from the blade or vane leading edge point, the center distance being less than 32% of the given length. The advantages of this compressor blade or vane follow in accordance with the above statements.

In accordance with another feature of the invention, the suction surface profile has a suction surface tangent at a suction surface intersection point with a reference vertical or straight line cutting the section chord at right angles at 5% of the length of the section chord and the pressure surface profile has a pressure surface tangent at a pressure surface intersection point with the reference vertical or straight line, the suction surface tangent and the pressure surface tangent enclosing between them a tangent angle of between 5° and 20°.

With the objects of the invention in view there is additionally provided a compressor blade or vane, comprising a blade or vane section having a blade or vane leading edge point; a blade or vane trailing edge point; a straight line section chord extending from the blade or vane leading edge point to the blade or vane trailing edge point and having a given length; a suction surface profile having a suction surface tangent at a suction surface intersection point with a reference straight line cutting the section chord at right angles at 5% of the given length; a pressure surface profile disposed opposite the suction surface profile and having a pressure surface tangent at a pressure surface intersection point with the reference straight line; and the suction surface tangent and the pressure surface tangent enclosing a tangent angle of between 5° and 20° between them.

The advantages of this compressor blade or vane follow correspondingly from the above statements.

In accordance with another feature of the invention, the blade or vane section encloses a circle with a maximum diameter, and the maximum diameter defines a maximum section thickness, in which case, with the designations:
D for the maximum section thickness,
L for the length of the section chord and
T for the tangent angle, a relative tangent angle $T_R$, which is between 1 and 2.5, in particular between 1.2 and 2, is defined by:

$$T_R = \frac{T}{100} \cdot \frac{L}{D}.$$

In accordance with a further feature of the invention, a boundary layer of the gas appears on the suction surface profile when a gas flows around the compressor blade or vane with a specified incident flow velocity, a velocity maximum occurs in the boundary layer, and the blade or vane section is selected to ensure that at a value of the incident flow velocity which is greater than a Mach number of 0.4, there is a transition location at which the flow changes from laminar to turbulent and at which the gas has a transition velocity which is at least 90% of the velocity maximum. This provides a blade or vane which has low aerodynamic losses, particularly due to the fact that it accelerates the turbulent flow of the gas over, at most, a trivial distance. This is achieved because the velocity maximum (before which any acceleration of the gas has taken place) is located very close to the transition point to turbulent flow. It is precisely the acceleration of a turbulent flow which introduces large aerodynamic losses and the aerodynamic losses are therefore kept small by the, at most, trivial acceleration of the turbulent flow.

In accordance with an added feature of the invention, when a gas flows around the blade or vane, a boundary layer of the gas appears along the suction surface profile from the blade or vane leading edge point to the blade or vane trailing edge point, whereby the blade or vane section is selected to ensure that a velocity maximum occurs at a maximum velocity location in the boundary layer, and a maximum velocity vertical or straight line passes through the maximum velocity location, cuts the section chord at right angles and is at a maximum velocity distance from the blade or vane leading edge point which is less than 15% of the length of the section chord.

In accordance with an additional feature of the invention, at between 1% and 99% of the length of the section chord, the blade or vane section has a section thickness which is at least 18% of the maximum section thickness. Such a high thickness reserve ensures a particularly strong construction of the compressor blade or vane.

The thickness reserve extending over almost the complete length of the blade or vane section means that the section thickness decreases very rapidly over the last part when approaching the blade or vane trailing edge.

With the objects of the invention in view there is furthermore provided a compressor of a stationary gas turbine, comprising the compressor blade or vane.

It is of particular advantage to employ compressor blades or vanes which are specially constructed for large Reynolds numbers and high degrees of turbulence in order to minimize aerodynamic losses, precisely in the case of the special flow conditions of the compressor of a stationary gas turbine.

Other features which are considered as characteristic for the invention are set forth in the appended claims.

Although the invention is illustrated and described herein as embodied in a compressor blade or vane and a compressor using such a blade or vane, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
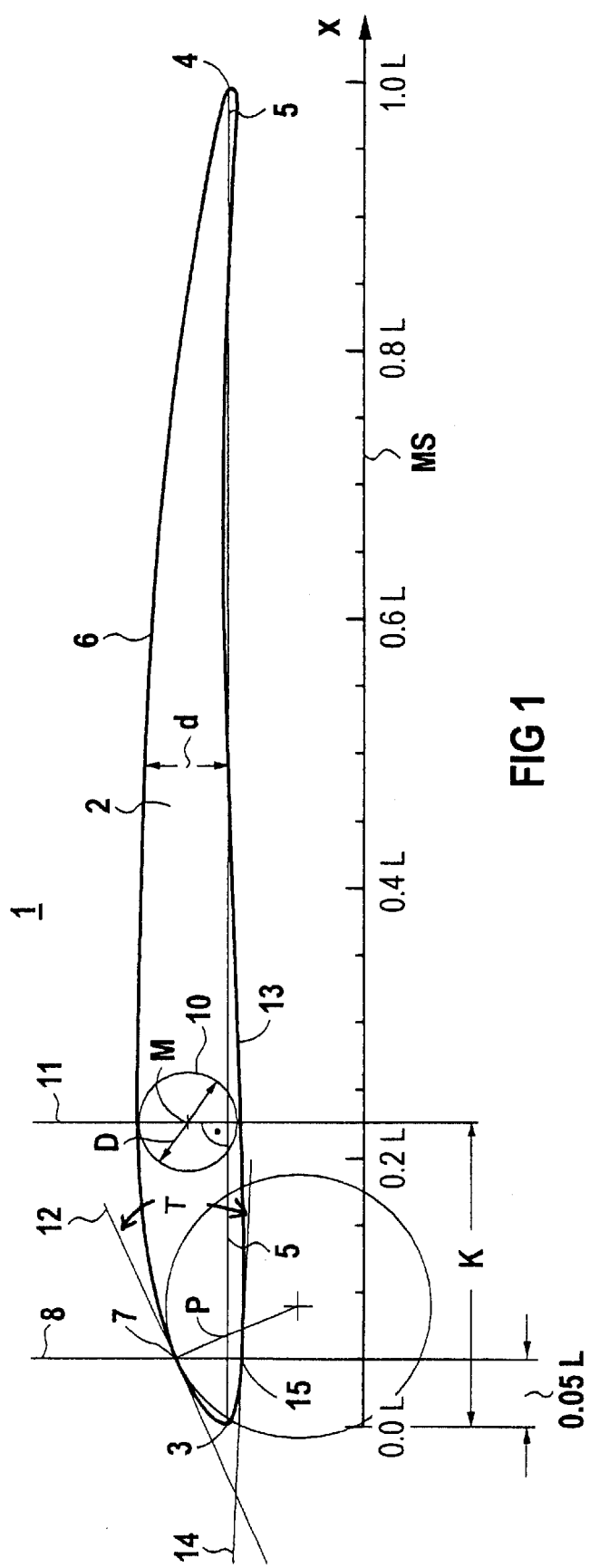
FIG. 1 is a diagrammatic, cross-sectional view of a compressor blade or vane.

Referring now in detail to the figures of the drawings, in which the same reference designations have the same significance, and first, particularly, to FIG. 1 thereof, there is seen a cross-section through a compressor blade or vane 1. This cross-section represents a blade or vane section 2. The blade or vane section 2 has a blade or vane leading edge point 3 and a blade or vane trailing edge point 4. A straight line distance between the blade or vane leading edge point 3 and the blade or vane trailing edge point 4 is a section chord 5. The blade or vane section 2 also has a suction surface profile 6 with a convex curvature connecting the blade or vane leading edge point 3 and the blade or vane trailing edge point 4. The suction surface profile 6 is located opposite a pressure surface profile 13 which connects the blade or vane leading edge point 3 and the blade or vane trailing edge point 4. A section thickness is indicated by reference symbol d. The blade or vane section 2 encloses a circle 10 with a maximum diameter D. A center distance vertical or straight line 11 passes through a center M of the circle 10. This center distance vertical 11 intersects the section chord 5 at right angles at a center distance K, measured from the blade or vane leading edge point 3. A scale MS clearly showing a length L of the section chord 5 is drawn parallel to the section chord 5. A reference vertical or straight line 8 intersects the section chord 5 at right angles at 5% of the length L of the section chord 5, measured from the blade or vane leading edge point 3. This value is indicated by 0.05L. The reference vertical 8 further intersects the pressure surface profile 13 at a pressure surface intersection point 15 and the suction surface profile 6 at a suction surface intersection point 7. The suction surface 6 has a suction surface curvature with a radius of curvature P at the suction surface intersection point 7. A suction surface tangent 12 is in contact with the suction surface profile 6 at the suction surface intersection point 7. A pressure surface tangent 14 is in contact with the pressure surface contour 13 at the pressure surface intersection point 15. The suction surface tangent 12 and the pressure surface tangent 14 enclose a tangent angle T between them.

The compressor blade or vane 1 is particularly suitable for employment under flow conditions with large Reynolds numbers and high degrees of turbulence because:
   a) the radius of curvature P is smaller than half the length L of the section chord 5,
   b) the center distance K is smaller than 32%, and in an appropriate case equal to 23%, of the length L of the section chord 5, and
   c) the tangent angle T lies between 5° and 20°.

Figure 2:
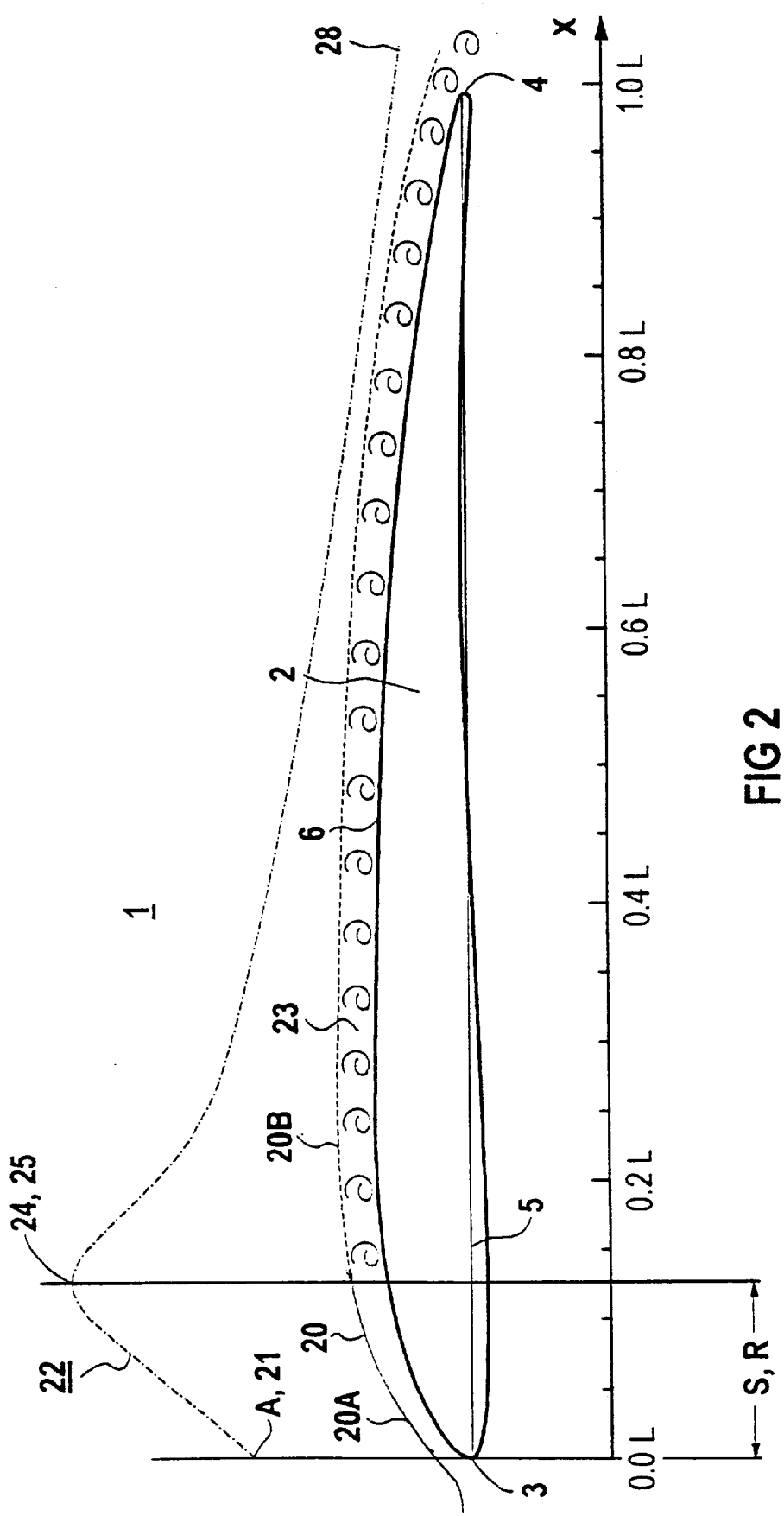
FIG. 2 is a cross-sectional view of a compressor blade or vane with air flowing around it.

FIG. 2 shows a cross-section of the compressor blade or vane 1 of FIG. 1. A flow of a gas 20 around the compressor blade or vane 1 is shown diagrammatically. Only the flow of the gas 20 along the suction surface profile 6 in a boundary layer 23 is illustrated. The flow of the gas 20 is initially a laminar flow 20A as measured from the blade or vane leading edge point 3. The laminar flow 20A becomes a turbulent flow 20B at a transition distance R, measured along the section chord 5 from the blade or vane leading edge point 3. At this point, the gas has a transition velocity 25. The velocity of the gas 20 is plotted with a dot-dash line as a velocity distribution 22 and as a function of the distance from the blade or vane leading edge point 3. The velocity distribution 22 has a value 21 for an incident flow velocity A at the blade or vane leading edge point 3. The velocity of the gas 20 increases with increasing distance X from the blade or vane leading edge point 3. A velocity maximum 24 is attained at a distance S from the blade or vane leading edge point 3. The velocity of the gas 20 decreases with a further increase in a distance X, until it has reached a value 28 at the end of the blade or vane 1. The value 28 is smaller than the value 21 of the incident flow velocity A.

Particularly low aerodynamic losses are achieved if the transition distance R and the distance S for maximum velocity coincide, particularly in the case of flow conditions with large Reynolds numbers and high degrees of turbulence. In consequence, there is no acceleration of the turbulent flow 20B. Such an acceleration would cause particularly high losses. In addition, the compressor blade or vane 1 is particularly suitable for the flow conditions quoted, in that the distance S for maximum velocity is less than 15% of the length L of the section chord 5.

Figure 3:
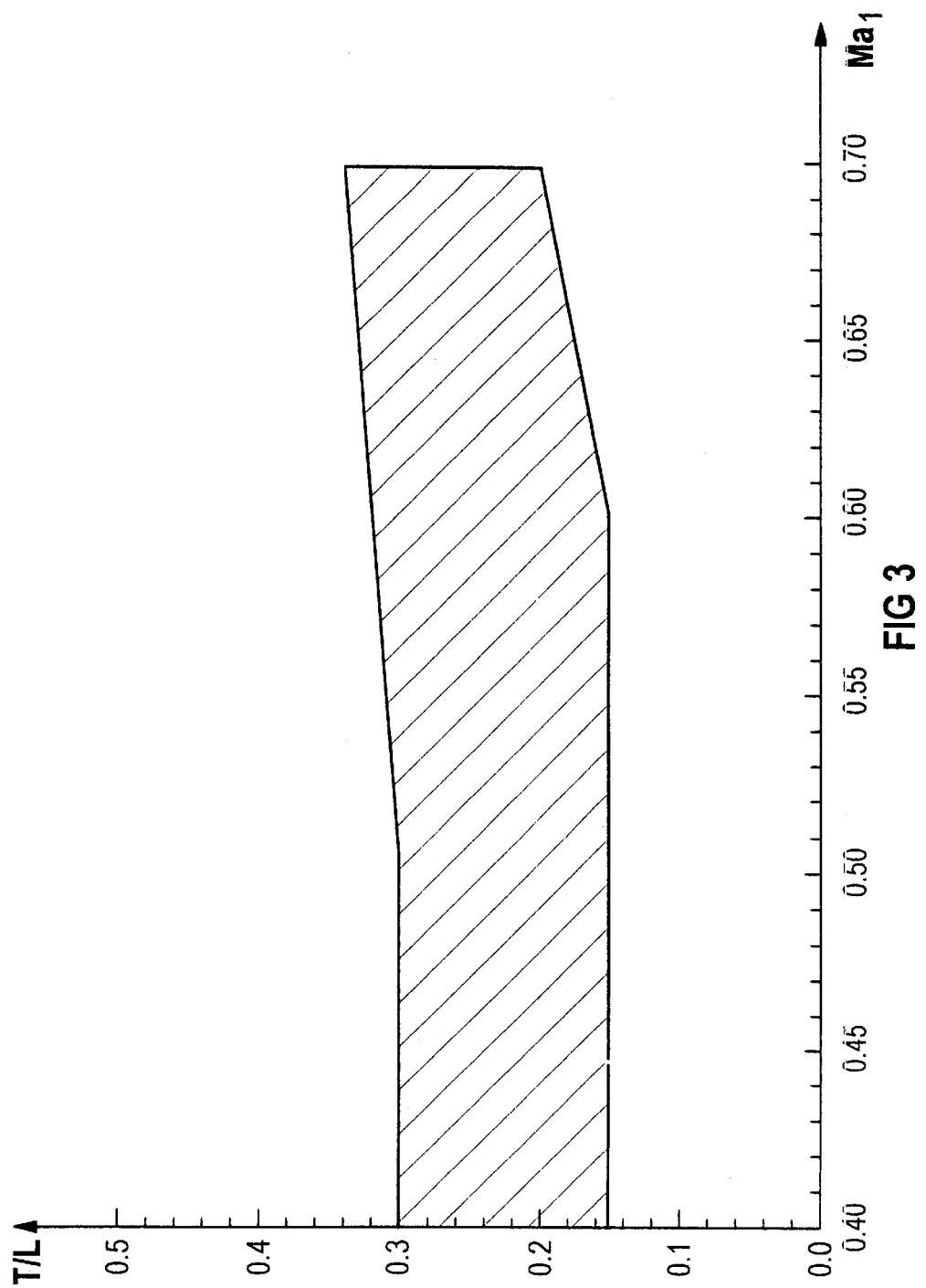
FIG. 3 is a graph showing positions of favorable maximum section thickness of a compressor blade or vane as a function of an incident flow velocity of a gas.

FIG. 3 is a diagram which shows a shaded region of values that are suitable in terms of aerodynamic losses for the center distance K of FIG. 1. The incident flow velocity A is given in values of a Mach number $Ma_1$, wherein a value $Ma_{1=}1$ signifies a sonic velocity in the gas 20 at the given temperature and the given pressure. The center distance K is given in units of the length L of the section chord 5, wherein the length L of the section chord 5 is normalized to 1. In the case of different boundary flow conditions, for example different angles of incidence of the gas 20 onto the compressor blade or vane 1, different values appear for the center distance K. The different values provide the region which is shaded. With respect to aerodynamic losses, suitable values for the center distance K are essentially smaller than 30% of the length L of the section chord 5.

Figure 4:
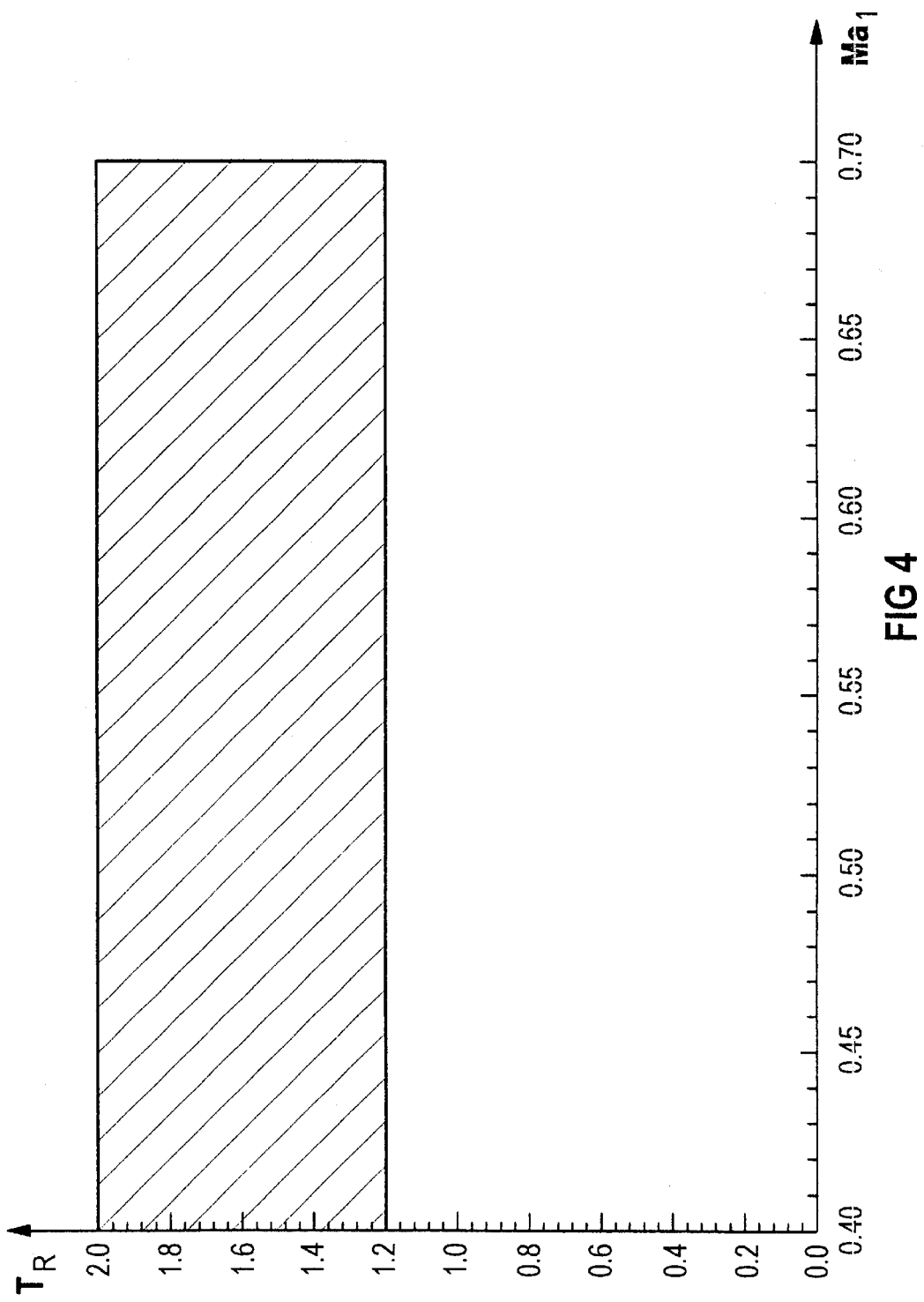
FIG. 4 is a graph showing a relative tangent angle of a compressor blade or vane as a function of the incident flow velocity of a gas.

FIG. 4 shows the tangent angle T, expressed as a relative tangent angle $T_R$, as a function of various values 21 for the incident flow velocity A. The units for the incident flow velocity A correspond to the units of FIG. 3. The relative tangent angle $T_R$ follows from the tangent angle T of FIG. 1 in accordance with:

$$T_R = \frac{T}{100} \cdot \frac{L}{D}.$$

Figure 5:
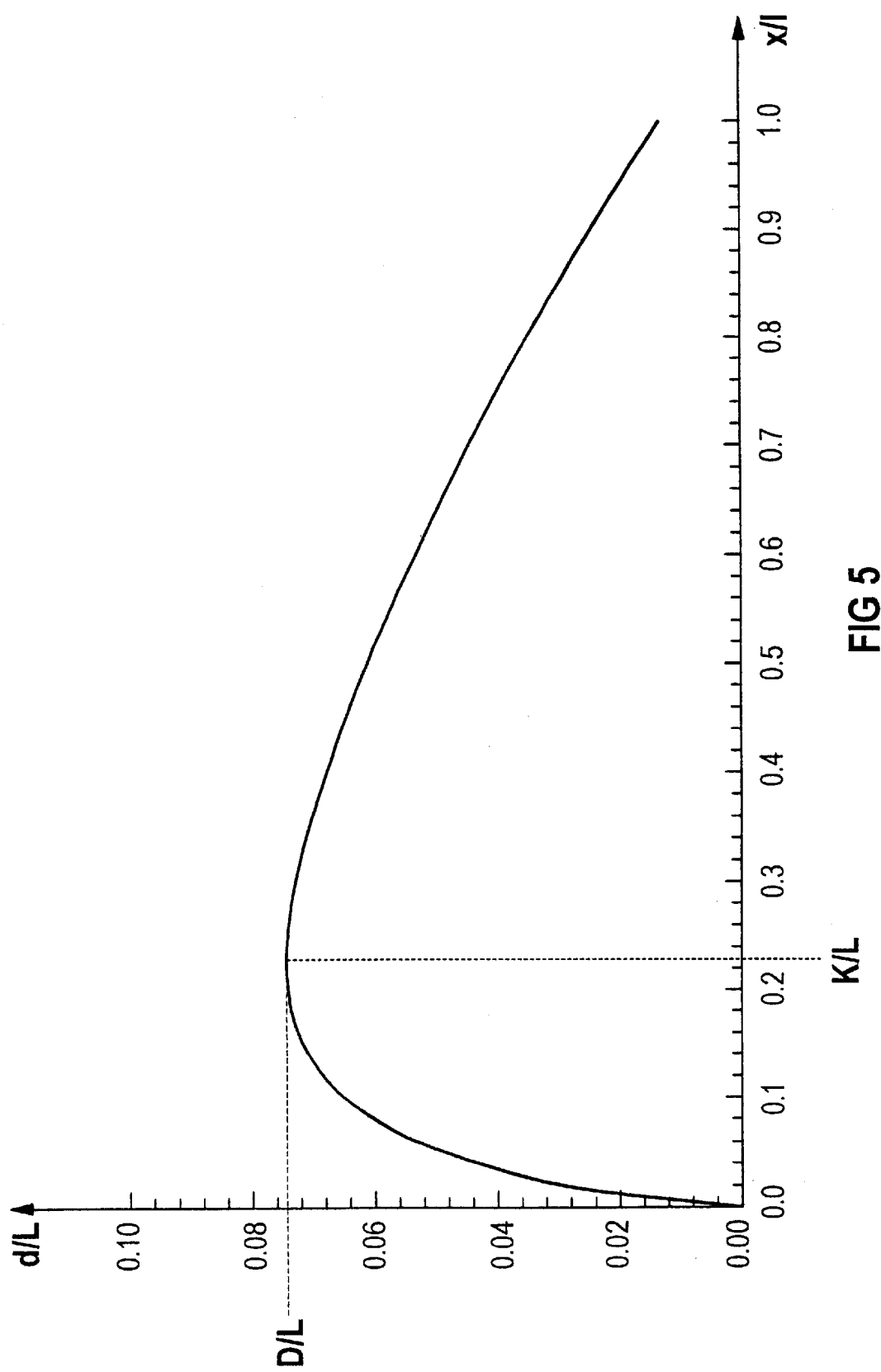
FIG. 5 is a graph showing shows a section thickness distribution of a compressor blade or vane along a section chord.

In FIG. 4, the region which contains values for the relative tangent angle $T_R$, that are suitable in terms of aerodynamic losses, is shown shaded. The various values of the region follow from the different boundary flow conditions. The relative tangent angle $T_R$ is therefore preferably located between 1.2 and 2.0. FIG. 5 shows the section thickness d of the compressor blade or vane 1 of FIG. 1 as a function of the distance X from the blade or vane leading edge point 3 along the section chord 5. The section thickness d and the distance X are normalized in terms of the length L of the section chord. A maximum section thickness d=D occurs at a center distance K of 23% of the length L of the section chord 5, X=K=0.23L.

Figure 6:
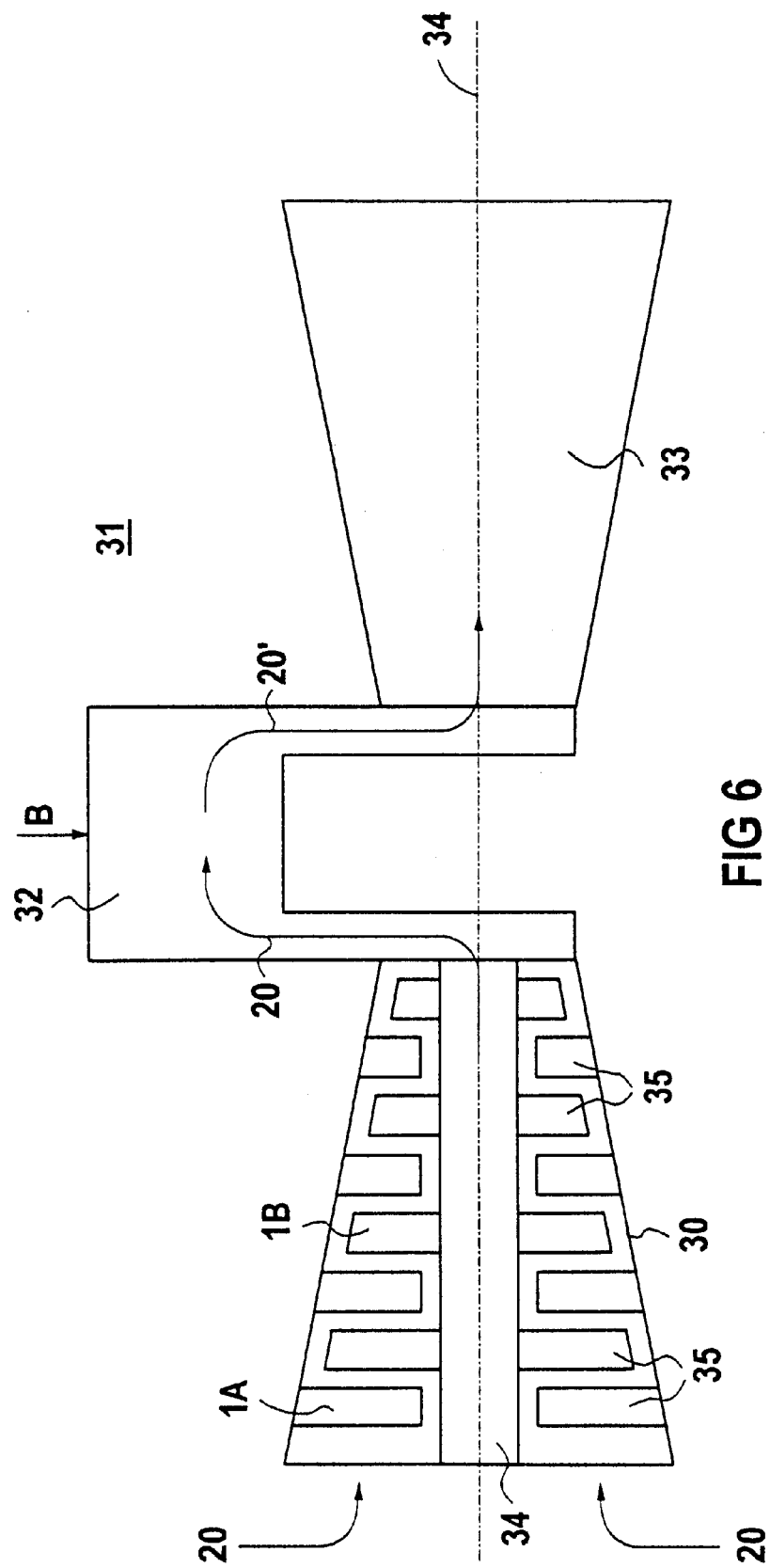
FIG. 6 is an elevational view of a gas turbine with a compressor.

FIG. 6 diagrammatically shows a gas turbine 31. A compressor 30 and a turbine 33 are disposed in sequence along a center line 34. A combustion chamber 32 is connected between the compressor 30 and the turbine 33. Blade and vane rows 35 are disposed along the center line 34 in the compressor 30. These blade and vane rows 35 are assembled from compressor blades and vanes 1 as shown in FIG. 1. Guide vane rows 1A and rotor blade rows 1B alternate along the center line 34. During operation of the gas turbine 31, air 20 is induced into the compressor 30. This air 20 is compressed in the compressor 30. The compressed air 20 reaches the combustion chamber 32 where, with a supply of fuel B, it is burnt to provide a combustion gas 20'. The combustion gas 20' expands in the turbine 33. The turbine 33 is driven in this way. Due to their configuration as presented above, the compressor blades and vanes 1 are suitable for the flow conditions occurring in the compressor 30, which are characterized by large Reynolds numbers and high degrees of turbulence. The result is low aerodynamic losses and, therefore, a high efficiency for the gas turbine 31.

We claim:

1. A compressor blade or vane, comprising a blade or vane section having:
   a) a blade or vane leading edge point;
   b) a blade or vane trailing edge point;
   c) a straight line section chord extending from said blade or vane leading edge point to said blade or vane trailing edge point and having a given length; and
   d) a suction surface profile with a convex curvature and a pressure surface profile opposite said suction surface profile, each of said profiles connecting said blade or vane leading edge point and said blade or vane trailing edge point, said suction surface profile having a radius of curvature at a suction surface intersection point with a reference straight line cutting said section chord at right angles at 5% of said given length, said radius of curvature being less than half of said given length of said straight line section chord.

2. The compressor blade or vane according to claim 1, wherein said blade or vane section encloses a circle having a maximum diameter, said maximum diameter defines a maximum section thickness, a center distance straight line passing through said center of said circle intersects said section chord at right angles and is at a center distance from said blade or vane leading edge point, and said center distance is less than 32% of said given length.

3. The compressor blade or vane according to claim 2, wherein said blade or vane section has a section thickness of at least 18% of said maximum section thickness, over between 1% and 99% of said given length.

4. The compressor blade or vane according to claim 1, wherein said center distance is between 15% and 30% of said given length.

5. The compressor blade or vane according to claim 1, wherein said suction surface profile has a suction surface tangent at said suction surface intersection point with said reference straight line, said pressure surface profile has a pressure surface tangent at a pressure surface intersection point with said reference straight line, and said suction surface tangent and said pressure surface tangent enclose a tangent angle of between 5° and 20° between them.

6. The compressor blade or vane according to claim 1, wherein said suction surface profile causes a boundary layer of gas to appear on said suction surface profile when a gas flows around the compressor blade or vane with a specified incident flow velocity, the boundary layer has a velocity maximum, and said blade or vane section causes a transition location in the boundary layer at which the flow changes from laminar to turbulent and at which the gas has a transition velocity of at least 90% of the velocity maximum, at a value of the incident flow velocity greater than a Mach number of 0.4.

7. The compressor blade or vane according to claim 1, wherein said suction surface profile causes a boundary layer of a gas to appear along said suction surface profile from said blade or vane leading edge point to said blade or vane trailing edge point when a gas flows around the blade or vane, said blade or vane section causes a velocity maximum to occur at a maximum velocity location in the boundary layer, and a maximum velocity straight line passes through the maximum velocity location, cuts said section chord at right angles and is at a maximum velocity distance from said blade or vane leading edge point of less than 15% of said given length.

8. A compressor of a stationary gas turbine, comprising a compressor blade or vane according to claim 1.

* * * * *